(12) United States Patent
Oral et al.

(10) Patent No.: US 9,443,013 B2
(45) Date of Patent: *Sep. 13, 2016

(54) QUESTION-RELATED IDENTIFICATION OF RELEVANT SOCIAL COMMUNITIES

(71) Applicant: International Business Machines Corporation, Armonk, NY (US)

(72) Inventors: Tolga Oral, Winchester, MA (US); Daniel Rucci, Cambridge, MA (US); Thomas Schaeck, Boeblingen (DE); Meggan H. Todd, Somerville, MA (US); Sara B. Weber, Arlington, MA (US)

(73) Assignee: International Business Machines Corporation, Armonk, NY (US)

(*) Notice: Subject to any disclaimer, the term of this patent is extended or adjusted under 35 U.S.C. 154(b) by 21 days.

This patent is subject to a terminal disclaimer.

(21) Appl. No.: 14/497,044

(22) Filed: Sep. 25, 2014

(65) Prior Publication Data

US 2015/0012548 A1  Jan. 8, 2015

Related U.S. Application Data

(63) Continuation of application No. 13/859,526, filed on Apr. 9, 2013.

(51) Int. Cl.
| | |
|---|---|
| *G06F 15/18* | (2006.01) |
| *G06F 17/30* | (2006.01) |
| *G06N 5/02* | (2006.01) |
| *G06Q 10/10* | (2012.01) |
| *G06Q 50/00* | (2012.01) |

(52) U.S. Cl.
CPC .......... *G06F 17/30861* (2013.01); *G06N 5/02* (2013.01); *G06Q 10/10* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 5,644,629 | A | 7/1997 | Chow |
| 7,499,973 | B2 | 3/2009 | Couts et al. |
| 7,536,665 | B1 | 5/2009 | Horlick et al. |
| 2003/0028525 | A1 | 2/2003 | Santos et al. |

(Continued)

OTHER PUBLICATIONS

Office Action for U.S. Appl. No. 13/859,526, dated Aug. 13, 2015, 21 pages, United States Patent and Trademark Office.
About—Stack Overflow, Apr. 2, 2013, 4 pages, <Stackoverflow.com/about>.

(Continued)

*Primary Examiner* — Kakali Chaki
*Assistant Examiner* — Kevin W Figueroa
(74) *Attorney, Agent, or Firm* — Jordan IP Law, LLC

(57) ABSTRACT

Methods, products, apparatus, and systems may identify one or more relevant social communities for one or more questions. Additionally, a user-question affinity value between a user and a question may be determined. In addition, a user-community affinity value between the user and each of a plurality of candidate social communities may be determined. Moreover, a question-community affinity value between the question and each of the plurality of candidate social communities may be determined based on the user-question affinity value and the user-community affinity value. The question-community affinity value determination may involve calculating a running average using the user-question affinity value and the user-community affinity value. The question-community affinity value may identify the one or more relevant social communities from the plurality of candidate social communities.

19 Claims, 3 Drawing Sheets

(56) References Cited

U.S. PATENT DOCUMENTS

| | | | |
|---|---|---|---|
| 2003/0216982 A1 | 11/2003 | Close et al. | |
| 2006/0036641 A1 | 2/2006 | Brydon et al. | |
| 2008/0005072 A1 | 1/2008 | Meek et al. | |
| 2010/0268716 A1 | 10/2010 | Degaugue et al. | |
| 2010/0318613 A1 | 12/2010 | Souza et al. | |
| 2011/0196922 A1 | 8/2011 | Marcucci et al. | |
| 2012/0095978 A1* | 4/2012 | Levin | G06Q 30/02 707/706 |
| 2013/0325775 A1* | 12/2013 | Sinyavskiy | G06N 3/08 706/25 |

OTHER PUBLICATIONS

What is Yahoo! Answers, Apr. 2, 2013, 2 pages, <http://answers.yahoo.com/info/product_tour;_ylt=AhiTmvCt48fmPqkmqII-FXPE_zKIX;_ylv=3>.

About Quora, retrieved Apr. 2, 2013, 2 pages, <www.quora.com/about>.

Automatic Routing of Inbound Faxes With Castelle Network Fax Servers, 2006, 24 pages, Castelle <http://www.techdata.com/techsolutions/networking/files/0207/Castelle%20Auto%20Routing.pdf>.

Routing & Storage: Streamline Operations with Automated Work Queues, Easy-Access Histories, and Past Chat Surveys, BoldChat, retrieved Apr. 9, 2013, 2 pages, Bold Software, LLC, <http://www-alpha.boldchat.com/live_chat_software/automatic-routing-interaction-storage.jsp>.

Final Office Action for U.S. Appl. No. 13/859,526, mailed Feb. 16, 2016, 24 pages, United States Patent and Trademark Office.

Yanhong Zhou et al., "Routing Questions to the Right Users in Online Communities", Data Engineering, 2009, ICDE'09, IEEE 25th International Conference on IEEE, 2009.

\* cited by examiner

QUESTION-RELATED IDENTIFICATION OF RELEVANT SOCIAL COMMUNITIES

CROSS-REFERENCE TO RELATED APPLICATIONS

The present application is a continuation of U.S. patent application Ser. No. 13/859,526 filed on Apr. 9, 2013.

BACKGROUND

Embodiments of the present invention generally relate to identifying one or more relevant social communities for one or more questions. More particularly, embodiments relate to determining a question-community affinity value between one or more questions and each of a plurality of candidate social communities to identify one or more relevant social communities for the one or more questions.

A question may be answered by implementing mechanisms that detect whether a relationship does or does not exist between a user and the question or between the user and a group. For example, mechanisms that search for a user related to the subject matter of the question may only require detecting the existence of a relationship between the user and the question, and may lack an evaluation of an affinity strength (e.g., between the question and the user, etc.). Mechanisms that search for, or post to, a forum community and/or an affinity group may only require detecting the existence of related users (e.g., members, friends, etc.), and may lack an evaluation of an affinity strength (e.g., between the user and the community, etc.). Mechanisms that notify a subject matter expert (SME) about the question may be based on identification as an expert, and may lack an evaluation of an affinity strength (e.g., between the question and the forum community, etc.). Mechanisms that return a search result to a requestor with a link may route the requestor, and not the search query, to other users via the link. Accordingly, inefficiencies may arise to identify relevant communities for one or more questions and/or to provide one or more responses to the one or more questions.

BRIEF SUMMARY

Embodiments may include a method involving determining a user-question affinity value between a user and a question based on one or more user metrics and one or more question metrics. The method may also provide for determining a user-community affinity value between the user and each of a plurality of candidate social communities based on at least one of the one or more user metrics and the one or more community metrics. In addition, the method may include determining a question-community affinity value between the question and each of the plurality of candidate social communities based on the user-question affinity value and the user-community affinity value. The method may identify one or more relevant social communities for the question.

Embodiments may include a computer program product having a computer readable storage medium and computer usable code stored on the computer readable storage medium. If executed by a processor, the computer usable code may cause a computer to determine a user-question affinity value between a user and a question. The computer usable code, if executed, may also cause a computer to determine a user-community affinity value between the user and each of a plurality of candidate social communities. The computer usable code, if executed, may also cause a computer to determine a question-community affinity value between the question and each of the plurality of candidate social communities based on the user-question affinity value and the user-community affinity value. The computer usable code, if executed, may cause a computer to identify one or more relevant social communities for the question.

Embodiments may include a computer program product having a computer readable storage medium and computer usable code stored on the computer readable storage medium. If executed by a processor, the computer usable code may cause a computer to determine a user-question affinity value between a user and a question based on one or more user metrics and one or more question metrics. The computer usable code, if executed, may also cause a computer to a determine a user-community affinity value between the user and each of a plurality of candidate social communities based on at least one of the one or more user metrics and the one or more community metrics. The computer usable code, if executed, may also cause a computer to determine a question-community affinity value between the question and each of the plurality of candidate social communities based on the user-question affinity value and the user-community affinity value. The computer usable code, if executed, may cause a computer to identify one or more relevant social communities including a plurality of members. The computer usable code, if executed, may cause a computer to enable the question to be routed to one or more of the relevant social communities based on the question-community affinity value. The computer usable code, if executed, may cause a computer to enable the question to be available to each of the members to respond to the question.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
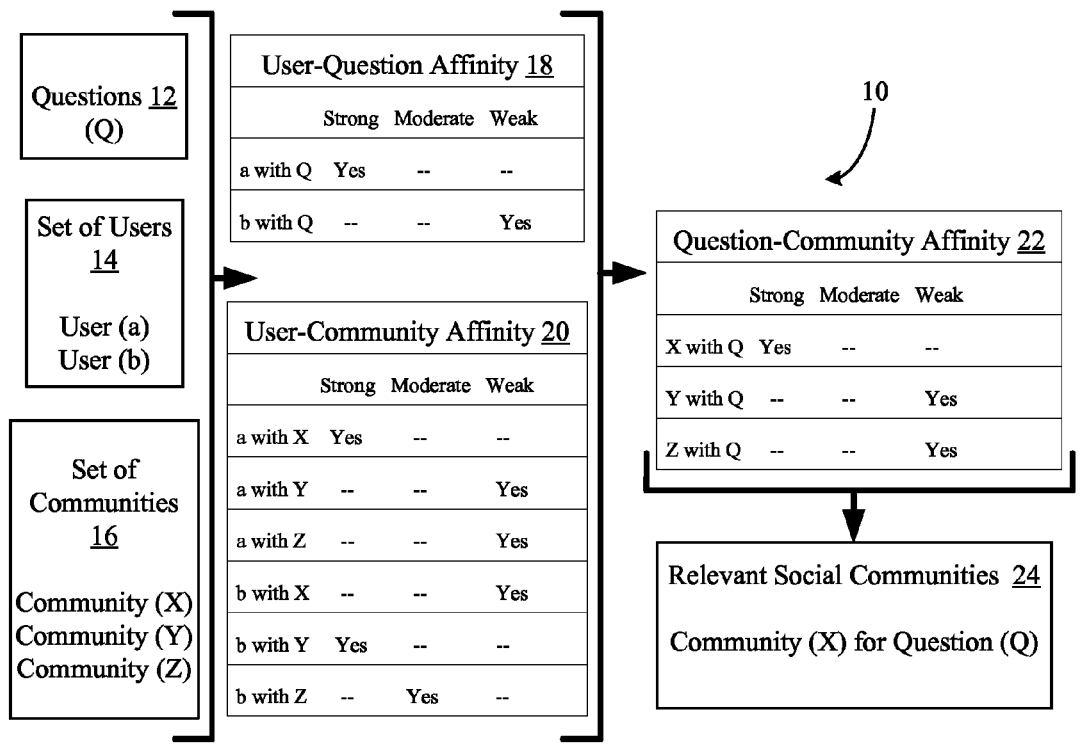
FIG. 1 is a block diagram of an example of a scheme of identifying one or more relevant social communities for one or more questions according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a scheme 10 is shown of identifying one or more relevant social communities for one or more questions according to an embodiment. A question may include any information request to elicit a response. The question and/or the response may be included in any work product that enables cooperation between two or more users. Examples of a work product may include a browser, an instant message, a chat, an email, a file, a post, a presentation, a document, a spreadsheet, and so on, or combinations thereof. In one example, a requestor may enter a question (e.g., search query) via a browser application (e.g., a web browser) to request information, and one or more social community users (e.g., community members) may respond to the question (e.g., responder) in response to the question. The response may involve any aspect of a cooperation, such as reviewing, editing, revising, adding, deleting, modifying, highlighting, forwarding, redacting, rendering an opinion, rating, recommending, and so on, or combinations thereof.

When faced with one or more questions, it may be valuable to know if there are one or more social communities that are closely related to the question. Such information may enable the question to be shared across one or more social communities while providing a maximized and/or an appropriate set of community users for the question. For example, knowledge related to a social community that is closely related (e.g., most closely related) to the question may be useful to suggest additional users (e.g., responders), to make the users of the closely related social community aware of the question, to provide access to the question, and so on, or combinations thereof.

In the illustrated example, one or more questions 12 may be identified and/or received. In one example, the question may include a search query entered via a browser application to elicit a response to the question. For the purpose of illustration, the questions 12 include a question (Q), which may be associated with one or more question metrics. Generally, any of the question metrics may include data related to a question tag, such as a keyword or term assigned to the question, data related to a question author, such as the question author, co-author, etc., data related to a question opinion, such as an up/down vote on the question, the user that voted, etc., and/or data related to a question view, such as the number of views, the user that viewed, etc. Any of the question metrics may include data related to a question comment, such as a text comment associated with the question (e.g., text may be used to understand what the question is about), the user that provided the comment, etc. In one example, processes such as natural language processing or clustering algorithms amongst various questions and/or corresponding comments may be employed to determine how the questions may be related. Any of the question metrics may include data related to a question responder, such as the user that responded to the question, responded to similar questions, etc., and/or data related to a question responder community, such as the social community that responded to the question, responded to similar questions, etc.

Any of the question metrics may also include data related to an unaccepted question answer, such as unaccepted answers for the question, unaccepted answers for similar questions, the user that provided the unaccepted answer, etc., and/or data related to an attempted question answer, such as attempted answers for the question, attempted answers to similar questions, the user that provided the attempted answer, etc. Any of the question metrics may further include a question category, such as a user generated category for the question, a computer generated category for the question, categories generated from the question, from the comment text, from question tags, etc. Any of the question metrics may include a question watch list, such as a watch list for the question, for the subject matter of the question, etc., data related to a question interaction, such as a question forward, revision, answer, copy, share, "favorite", bookmark, highlight, etc., data related to a question participant, such as an author, a reviewer, a reviser, an answerer, etc., data related to question metadata, such as data providing information about the aspects of the question, etc., and/or data related to question content, such as the subject matter of the question, keywords in the question, etc.

In the illustrated example, a set of users 14 may be received and/or identified. In one example, one or more of the users may be affiliated (e.g., members) with one or more social communities. For the purpose of illustration, the set of users 14 include a user (a) and a user (b), which may be associated with one or more user metrics. Generally, any of the user metrics may include data related to a user affiliation, such as an affiliation to a social community, etc. Any of the user metrics may include data related to a user interaction, such as regarding a social community the user most recently interacted with, interactions with the question (e.g., voting, responding), etc. Any of the user metrics may also include data related to a user watch list, such as questions followed by the user, watched by the user, etc. Any of the user metrics may include data related to a user tag, such as a user tag for a watch list in a question-and-answer (Q&A) system, tags that a user is willing to receive to answer questions, tags on a user profile, user generated tags, computer generated tags, tags generated based on user content such as content created by the user, etc.

Any of the user metrics may further include data related to a user category, such as a user generated category, etc., data related to user identifying information, such as a user name, a user address, user role information, such as a recipient, an author, a co-author, an originator, a reviewer, a participant, etc., and/or data related to a user bookmark, such as a question bookmarked, a web page bookmarked, etc. Any of the user metrics may include data related to user activity information, such as a user search history, a question asked, a question answered, a question viewed, a comment to a question, a comment to an answer, a copy action, an edit action, a response action, a vote action, a view action, a share action via various mechanisms such as email, community, profiles, etc. Any of the user metrics may include data related to user metadata, such as data providing information about the aspects of the question, etc., and/or an access list, such as an Internet Protocol (IP) address access list, a database access list, etc.

In the illustrated example, a set of communities 16 including a plurality of candidate social communities (X), (Y), (Z) may be received and/or identified. Generally, one or more candidate social communities may include in an online social community, such as intranet social community and/or internet social community, where users may interact and/or establish relationships with each other. For the purpose of illustration, a social intranet community may include a social community of employees able to communicate over an internal employer computer network. Internet social communities may include, for example, FACEBOOK®, TWITTER®, LINKEDIN® (registered trademarks of Facebook, Twitter, and Linkedin, respectively) web sites. In addition, internet social communities may include question-and-answer (Q&A) web sites, such as QUORA®, YAHOO!® ANSWERS, and STACK OVERFLOW® (registered trademarks of Quora, Yahoo, and Stack Overflow, respectively).

A candidate social community may include two or more people (e.g., a group) that communicate based on one or more criteria, such as shared interests, particular subjects, and so on, or combinations thereof. For the purpose of illustration, a candidate social community may include two or more users that "like" a particular FACEBOOK® web page. In addition, any candidate social community may include two or more people that express a relationship with each other, such as a professional, personal, familial, geographic, and/or educational relationship. Users of a social community may establish relationships with each other, such as by joining a group, becoming "friends", and/or establishing a "connection" to form a candidate social community. A candidate social community may be pre-existing.

The plurality of candidate social communities (X), (Y), (Z) may be associated with one or more community metrics. Generally, any of the community metrics may include data related to a community affiliation, such as the users affiliated with the community, etc. Any of the community metrics may include data related to community content, such as the subject matter of the community, trends of the community, etc. Any of the community metrics may include data related to a community tag, such as tags computed from the community content, tags computed from categories of the community content, etc. Any of the community metrics may include data related to a community category, such as a user generated category, a member generated categories, etc. Accordingly, one or more of the question metrics, one or more of the user metrics, and/or one or more of the community metrics may include data mined from, for example, a browser, an instant message, a chat, an email, a file, a post, a presentation, a document, a spreadsheet, a mailing list, a database access list (ACL), an organization chart, an organization group, a membership, a communication record, metadata, a static group, a dynamic group, a nested group, a hybrid group, a Lightweight Directory Access Protocol (LDAP) group, an opinion associated with a post, a rating, a recommendation, data storage, and so on, or combinations thereof.

In one example, the mailing list may include an athletic mailing list, a political mailing list, a professional mailing list, an educational mailing list, etc. The ACL may specify which users are to be granted access to objects and/or resources. The communication record may include a phone record, a chat record, etc. The membership may include a community membership, a gym membership, etc. Geospatial data may also be used, such as the location of the users in the candidate social community. The chart and/or group may include an employment chart, a group chart, an activities chart, a group activity, etc.

The group may include a list and/or a collection of names, addresses, and so on, or combinations thereof. The group may include a Lightweight Directory Access Protocol (LDAP) group, wherein an LDAP server may run over Transmission Control Protocol/Internet Protocol (TCP/IP) as a directory service for both internet and non-internet applications. The group may include a static group, which may define each member individually. The group may include a dynamic group, which may define its members using an LDAP search. The group may include a nested group, which may enable the creation of hierarchical relationships that may be used to define inherited group membership. The group may include a hybrid group, which may include a combination of LDAP, static, dynamic, and nested member types.

The scheme 10 may be employed to accomplish more than detecting the existence of a relationship among the users (a), (b), the question (Q), and the candidate social communities (X), (Y), (Z). In one aspect of embodiments, the scheme 10 may be further employed to determine an affinity strength to identify one or more relevant social communities for the question (Q). Generally, the affinity strength may include a value, such as strong, moderate, weak, and/or none. The particular value (e.g., strong) may include a machine-readable value, an integer, and so on, or combinations thereof. The affinity strength may be determined to hold the particular value (e.g., strong) based on a threshold, such as a threshold number. The threshold number may be based on one or more of the question metrics, the user metrics, and/or the community metrics. For example, the threshold number may be based on a predetermined frequency of occurrence with respect to user activity, such as a predetermined frequency of user activity on a particular question, on a particular social community, and so on, or combinations thereof.

The threshold number may be based on an absolute number, such as absolute number of "up" or "down" votes. The threshold number may be a total number, such as a combination threshold numbers (e.g., average, mean, etc.) relative to a combination of the metrics. The threshold number may be set on a scale, such as where 0 may indicate no affinity and 1 may indicate complete affinity. The threshold for any particular value may be set relatively low or relatively high, such that the affinity strength may be determined to hold the particular value (e.g., strong, weak, etc.) where there is complete affinity, half affinity, quarter affinity, no affinity, and so on, or combinations thereof.

The affinity strength may also be determined to hold the particular value based on relative evaluations (e.g., strongest affinity strength where there is the most relative affinity). In addition, the affinity strength may be determined to hold the particular value based on weight information. The weight information may include the expertise of the requestor, a number of total members in the candidate social community, expertise of the members in the candidate social community, and on, or combinations thereof. For example, where there are twenty total users in one candidate social community and hundreds in a second candidate social community, one or more of the candidate social communities may be weighted to account for the size of the sets (e.g., to normalize the sets, to give greater and/or less weight to the sets, etc.). Moreover, any criteria may be used to supplement the affinity strength determination (whether automatic or manual), such as requestor and/or responder preference information, history information, social community reliability information, user reliability information, and so on, or combinations thereof.

A user-question affinity value 18 (e.g., strong, moderate, weak, none, etc.) may be determined between the user (a) and/or the user (b) and the question (Q) based on one or more of the user metrics and one or more of the question metrics. In one example, the user-question affinity value 18 may represent the extent of affinity (e.g., affinity strength) of the users (a), (b) to the question (Q). For example, the user-question affinity value 18 may be determined from the activity (e.g., extent, type, etc.) of the user (a) or the user (b) corresponding to one or more questions having similar subject matter with respect to the question (Q), to the question (Q) itself, and so on, or combinations thereof.

For the purpose of illustration, the user-question affinity value 18 may be determined to hold a strong value between the user (a) and the question (Q), for example, if the user (a) has tags for the question (Q) (or for the type of question (Q), etc.) in a watch list, has successfully answered the question (Q) (e.g., successfully answered the question as evidenced by one or more of an acceptance by the requestor, as voted by other users, etc.), has viewed, edited, asked, commented, etc., on the question (Q) or similar questions, and so on, or combinations thereof. The user-question affinity value 18 may be determined to hold a weak value between the user (b) and the question (Q), for example, if the result of such evaluations is negative, as evidenced by unsuccessful answers related to the question (Q) and/or similar questions, lack of the tags, lack of the watch list, few and/or no question views, and so on, or combinations thereof.

Additionally, the user-question affinity value 18 may represent the extent of affinity of the question (Q) to the user (a) or the user (b). In one example, the user-question affinity value 18 may be determined using information extracted from the question itself, from question metadata, and so on, or combinations thereof. The question may be parsed, for example, to extract data (e.g., keywords, metadata, etc.) that may be used to determine an affinity value (e.g., strong, moderate, weak, etc.) between the users (a), (b) and the question (Q). For the purpose of illustration, the user-question affinity value 18 may be determined to hold a strong value between the user (a) and the question (Q), for example, if the question (Q) includes one or more keywords that match one or more keywords of the profile of the user (a), and/or may be determined to hold a weak value between the user (b) and the question (Q), for example, if the result of the match is negative. Accordingly the user-question affinity value may represent bi-directional evaluations with respect to the extent of affinity (e.g., a bi-directional user-question affinity strength value).

The user-question affinity value 18 may further be established and/or modified using any criteria relative to one or more of the user metrics and/or one or more of the question metrics. In one example, the user-question affinity value 18 may be modified by the number and/or type of questions the user (a) or the user (b) interact with. For the purpose of illustration, the user (a) may be a specialist in the data structure field and/or answer a relatively large number of questions in the data structure field. Thus, the user-question affinity value 18 between the user (a) and the question (Q) may be modified toward a strong value where the question (Q) involves a database question and/or where the user (a) has answered relatively many questions in the data structure field. In addition, the user (b) may be a generalist in the engineering field and/or a specialist in the RF field that does not answer many questions in the data structure field (or answers incorrectly, etc.), thereby modifying the user-question affinity value 18 between the user (b) and the question (Q) toward a weak value.

In another example, the user-question affinity value 18 may be established and/or modified by votes from other users (e.g., community members) on a question that the user (a) or the user (b) has asked and/or answered, by votes on answers provided by the user (a) or the user (b), and so on, or combinations thereof. For the purpose of illustration, the user-question affinity value 18 may be determined to hold a strong value between the user (a) and the question (Q), for example, if the answer provided to the question (Q) by the user (a) is voted "up" by the other users, while the user-question affinity value 18 may be determined to hold a weak value between the user (b) and the question (Q), for example, if the answer provided to the question (Q) by the user (b) is voted "down" by the other users. In addition, the user-question affinity value 18 may be established and/or be modified to hold the particular value based on a threshold relative to one or more of the user metrics and/or one or more of the question metrics, such as a threshold of "up" votes, "down" votes, successful answers, unsuccessful answers, and so on, or combinations thereof.

A user-community affinity value 20 (e.g., strong, moderate, weak, none, etc.) may be determined between the user (a) and the user (b) and each of the plurality of candidate social communities (X), (Y), and (Z) based on at least one of the one or more user metrics and one or more community. In one example, the user-community affinity value 20 may represent the extent of affinity (e.g., affinity strength) of the users (a), (b) to each of the candidate social communities (X), (Y), (Z). For example, the user-community affinity value 20 may be determined from the activity (e.g., extent, type) of the users (a), (b) in each of the candidate social communities (X), (Y), (Z). For the purpose of illustration, the user-community affinity value 20 may be determined to hold a strong value between the users (a), (b) and the candidate social communities (X), (Y), for example, if the users (a), (b) are each a content creator in the candidate social communities (X), (Y), respectively, if the users (a), (b) relatively frequently visit the candidate social communities (X), (Y), respectively, and so on, or combinations thereof.

The user-community affinity value 20 may be determined to hold a weak value between the users (a), (b) and the candidate social communities (X), (Y), and/or (Z), for example, if the result of such evaluations are negative, as evidenced by the users (a), (b) exclusively being a content consumer, visiting relatively infrequently, and so on, or combinations thereof. For the purpose of illustration, the user-community affinity value 20 may be determined to hold a weak value between the user (b) and the candidate social community (X), for example, where the user (b) interacts with the candidate social community (X) relatively infrequently, while holding a moderate value between the user (b) and the candidate social community (Z), for example, if the user (b) also interacts with the candidate social community (Z) more frequently than with the candidate social community (X) but less frequently that that amount to qualify for a strong value (e.g., than the interaction with the candidate social community (Y) and/or than the interaction of the user (a) with the with candidate social community (X)).

Additionally, the user-community affinity value 20 may represent the extent of affinity of the candidate social communities (X), (Y), (Z) to the users (a), (b). In one example, the user-community affinity value 20 may be determined by considering the extent of affinity of other users (e.g., every user, a subset, etc.) in the candidate social communities (X), (Y), (Z), by considering the tenure (e.g., proportionate to age of the respective community) of the users in the candidate social communities (X), (Y), (Z), the number of users in the candidate social communities (X), (Y), (Z), the activity distribution (e.g., a relatively few contributors, relatively many contributors, etc.) in the candidate social communities (X), (Y), (Z), and so on, or combinations thereof. For the purpose of illustration, the user-community affinity value 20 may be determined to hold a strong value between the users (a), (b) and the candidate social communities (X), (Y), for example, if the users (a), (b) have been members since the inception of the candidate social communities (X), (Y), respectively. Accordingly, the user-community affinity value 20 may represent bi-directional evaluations with respect to the extent of affinity (e.g., a bi-directional user-community affinity strength value).

The user-community affinity value 20 may be further established and/or modified using any criteria. In one example, similar to the mechanism described above, the user-community affinity value 20 may be established and/or modified by employing any criteria relative to one or more metrics, such as one or more of the user metrics and/or one or more of the community metrics. For example, the user-community affinity value 20 may be normalized by the number of users in the candidate social community and/or by their respective interactions from the perspective of the community. For the purpose of illustration, the user-community affinity value 20 may be modified by considering if the candidate social communities (X), (Y), (Z) include a relatively large number of users (e.g., community members), by considering whether the users are relatively active (and/or inactive, etc.), and so on, or combinations thereof. In addition, and similar to the mechanism described above, the user-community affinity value 20 may be established and/or be modified to hold the particular value based on a threshold relative to one or more metrics, such as one or more of the user metrics and/or one or more of the community metrics. For example, a threshold number may be employed representative of a number of users (e.g., among all of the users) that are relatively active, a threshold number representative of activity, and so on, or combinations thereof.

A question-community affinity value 22 (e.g., strong, moderate, weak, none, etc.) may be determined between the question (Q) and each of the plurality of candidate social communities (X), (Y), and (Z) based on the user-question affinity value 18 and the user-community affinity value 20. As will be described in further detail below, a running average using a numerical user-question affinity value and a numerical user-community affinity value may be calculated to determine a numerical question-community affinity value. The question-community affinity value 22 may represent the extent of affinity (e.g., affinity strength) between each of the candidate social communities (X), (Y), (Z) and the question (Q). For the purpose of illustration, the question-community affinity value 22 may be determined to hold a strong value between the candidate social community (X) and the question (Q), for example, if the user-question affinity value 18 between the user (a) and the question (Q) is strong and if the user-community affinity value 20 between the user (a) and the candidate social community (X) is also strong.

The question-community affinity value 22 may be determined to hold a particular value based on any predetermined criteria. In one example, the question-community affinity value 20 may be determined to hold a particular value if both the user-question affinity value 18 and the user-community affinity value 20 are each determined to be the relatively best representative of that particular value. For example, the question-community affinity value 22 may be determined to hold a strong value if both the user-question affinity value 18 and the user-community affinity value 20 are each determined to be the relatively strongest values (e.g., are moderate values while all others evaluated are weak values).

The question-community affinity value 22 may also be determined to hold a particular value, for example, if a combination of the user-question affinity value 18 and the user-community affinity value 20 are determined to be the particular value and/or the best available value. In one example, the question-community affinity value 20 may be determined to hold a strong value, for example, if a combination of the user-question affinity value 18 and the user-community affinity value 20 are determined to be the strong value (e.g., strong in an of itself by all or a majority of strong values, strong from an average of a strong value and a moderate value, etc.), the best available value (e.g., the strongest value) and so on, or combinations thereof.

While the examples of the question-community affinity value 22 have been discussed in terms of a strong value, it is understood that the question-community affinity value 22 may be determined to hold a weak value, for example, if the result of such evaluations are negative, as evidenced by determining one or more of the user-question affinity value 18 and the user-community affinity value 20 is a weak value, a relatively weak value, and so on, or combinations thereof. In addition, the question-community affinity value 22 may be modified using any modifying criteria similar to the modifying criteria presented above. For example, modification using any of the herein described metrics may shift the question-community affinity value 22 toward and/or away one or more of a strong value, a moderate value, and/or a weak value, a threshold, and so on, or combinations thereof.

Determination of the question-community affinity value 22 may also involve employing a threshold, such as a threshold numbers presented above. For example, a threshold number may be set for the question-community affinity value 22 to determine a particular value (e.g., strong). For example, the threshold number for the question-community affinity value 22 may be set relatively high (e.g., about 99%, 95%, 90%, etc. on a scale of 0% to 100%). As will be discussed in detail below, history information, natural language processing, and/or machine learning may modify the question-community affinity value 22. In addition, it should be understood that the question-community affinity value 22 may represent bi-directional evaluations with respect to the extent of affinity (e.g., a bi-directional question-community affinity strength value), insofar as one or more of the user-question affinity value 18 and the user-community affinity value 20 may represent bi-directional evaluations.

The question-community affinity vale 22 may be used to identify one or more relevant social communities 24 from the candidate social communities (X), (Y), and (Z) for the question (Q). In one example, each of the candidate social communities (X), (Y), (Z) may be sorted based on their corresponding question-community affinity values 22 (e.g., strong, moderate, weak, none, etc.) to identify the relevant social communities 24. Each of the candidate social communities (X), (Y), (Z) may be sorted in descending or ascending order, for example in descending order from a strong question-community affinity value 22 to a weak question-community affinity values 22. The sorting may involve partitioned ordering, such as where the candidate social community (X) may be a first entry for the question (Q) followed by the candidate social communities (Y) and/or (Z).

The sorting may involve separate ordering, such as where the candidate social community (X) is the first entry for the question (Q) and other relevant social communities are the first entries for their respective questions. The sorting may also involve mixed ordering, such as where the candidate social community (X) is the first entry for the question (Q), followed by a next relevant social community for a second question, and so on. Any other criteria may be considered to implement the sorting (whether manual or automatic), such as predetermined limitations (e.g., sort the largest communities first, the communities with the most educated members first, etc.), user preference information (e.g., sort from strongest to weakest, etc.), history information (e.g., prior sorting), user reliability information (e.g., member ratings), community reliability information (e.g., community ratings), and so on, or combinations thereof. The sorting may be implemented before, during, after, and/or irrespective of any selecting, which is described below.

Any of the candidate social communities (X), (Y), (Z) may be selected based on their corresponding question-community affinity values 22 (e.g., strong, moderate, weak, none, etc.) to identify the relevant social communities 24. The candidate social communities (X), (Y), (Z) may be selected before, during, after, and/or irrespective of any sorting, as described above. The selection may involve automatic selection, manual selection, and so on, or combinations thereof. For the purpose of illustration, the candidate work social community (X) may be automatically selected as the relevant social community 24 for the question (Q) based on its corresponding question-community affinity value 22 (e.g., strong). The selection may involve input from one or more users, such as where an unsorted list of the candidate social communities (X), (Y), (Z) with their corresponding question-community affinity values 22 are provided to the one or more requestors for manual selection. Any other criteria may be considered to implement the selecting (whether manual or automatic), such as predetermined limitations (e.g., limiting the social community type, community number, always select the first entry, always select the strongest question-community affinity value, etc.), user preference information (e.g., sort the professional communities first, etc.), history information (e.g., prior selecting), user reliability information (e.g., member ratings), community reliability information (e.g., community ratings), and so on, or combinations thereof.

Accordingly, unsorted information, sorted information, unselected information, and/or selected information may be provided to one or more requestors, one or more users, to one or more logic, and/or stored. For example, such information may be provided to one or more requestors as an attachment to a message, as a link, in a shared folder and/or environment, on a display of a user platform, and so on, or combinations thereof. For the purpose of illustration, the candidate work social community (X) for the question (Q) may be automatically sorted, selected, and/or provided to one or more requestors, provided to one or more users, provided to logic, stored for retrieval, for editing, for re-ordering, for approval, and so on, or combinations thereof. A same and/or different data storage may be used to store information corresponding to the questions 12, the set of users 14, the set of communities 16, the user-question affinity values 18, the user-community affinity values 20, and/or the question-community affinity values 22. The data storage may involve a data structure such as a database, a table, and so on, or combinations thereof.

At least one user, such as a user affiliated with the relevant social communities 24 (e.g., affiliated member), may become aware of the question (Q). Users of a relevant social community may establish relationships with each other, such as by joining a group, becoming "friends", and/or establishing a "connection", and therefore may be affiliated members of the relevant social community. In addition, using a relevant social community may cause the user to be an affiliated member of the relevant social community. Moreover, being logged into (or having logged into) a relevant social community may cause the user to be an affiliated member of the relevant social community. Sharing an interest and/or opinion over a relevant social community may also cause the user to be an affiliated member of the relevant social community. Having an account and/or a profile on a relevant social community may cause the user to be an affiliated member of the relevant social community. For the purpose of illustration, at least one member affiliated with the relevant work social community (X) may become aware of the question (Q).

The user may become aware of the question by any suitable mechanism, such as via an automatic notification using an electronic message, a text message, a link, and so on, or combinations thereof. In addition, the user may become aware by logging into the social community, by accessing a shared folder and/or environment, and so on, or combinations thereof. The question may be routed to the relevant social community and/or user, such as the affiliated member and/or the relevant social community, for example via the automatic notification mechanism. For the purpose of illustration, each member affiliated with the relevant work social community (X) may view the question (Q), answer the question (Q), tag the question (Q), bookmark the question (Q), share the question (Q), edit the question (Q), vote on the question (Q), and so on, or combinations thereof.

The question-community affinity value 22 may be adaptively modified based on historical information, natural language processing (NLP), and/or machine learning (ML). In one example, history information may include data related to questions routed to one or more relevant social communities, question successfully answered by one or more members of the relevant social communities, and so on or combinations thereof. The history information may be used, for example, to adaptively modify the question-community affinity value 22 and to identify the relevant social communities 24 that maximize the likelihood of successful responses. For the purpose of illustration, when the question (Q) (or a similar question) is identified and/or received, the history information may be employed to modify the question-community affinity value 22 where the question (Q) has previously been routed to the relevant social community 24 (e.g., (X)), where questions similar to the question (Q) have previously be routed to the relevant social community 24 (e.g., (X)), where users (e.g., affiliated members) of the relevant social community 24 (e.g., (X)) have consistently provided relevant responses to the question (Q), and so on, or combinations thereof.

NLP may also be employed to modify the question-community affinity value 22. For example, NLP may be employed for one or more questions to determine if the question is associated with one or more classifications. The classification may include a topic classification, a geolocation classification, a country classification, and so on, or combinations thereof. NLP may be employed, for example, to determine the language of the requestor, which may associate the question and/or the user to a particular geolocation and/or country, and to modify the question-community affinity value 22 according the classification. A question metric (e.g., question meta data, etc.) and a community metric (e.g., community content, community members, etc.), for example, may also be employed to modify the question-community affinity value 22 according to the classification. For the purpose of illustration, the question (Q) may be routed to the relevant social community 24 (e.g., (X)) if it has a predetermined number (e.g., most, all, etc.) of members in North America when the question (Q) is asked is in the English language, when the question (Q) is related to North American holidays, and/or when the requestor is located in North America.

ML may be employed to adaptively modify the question-community affinity value 22 and to identify the candidate social communities 24 that maximize the likelihood of successful responses. In one example, the scheme 10 may learn from successes (and/or mistakes) related to previously routed questions, for example based on rating information, voting information, acceptance information, and so on, or combinations thereof. In addition, a user interface for the routed question may allow a requestor, a responder, a user and/or an administrator to tag the question, for example as "unrelated", as "relevant", and so on, or combinations thereof. ML mechanisms may be employed to maximize the likelihood of acceptable responses regardless of whether the question is answered in the social community it is routed to, regardless of whether it is unanswered in the community it is routed to, and so on, or combinations thereof. Moreover, answered questions may be routed to a social community to provide content information to the social community, which may be reverted by the social communities back to the ML mechanism to maximize the likelihood of acceptable responses.

Figure 2:
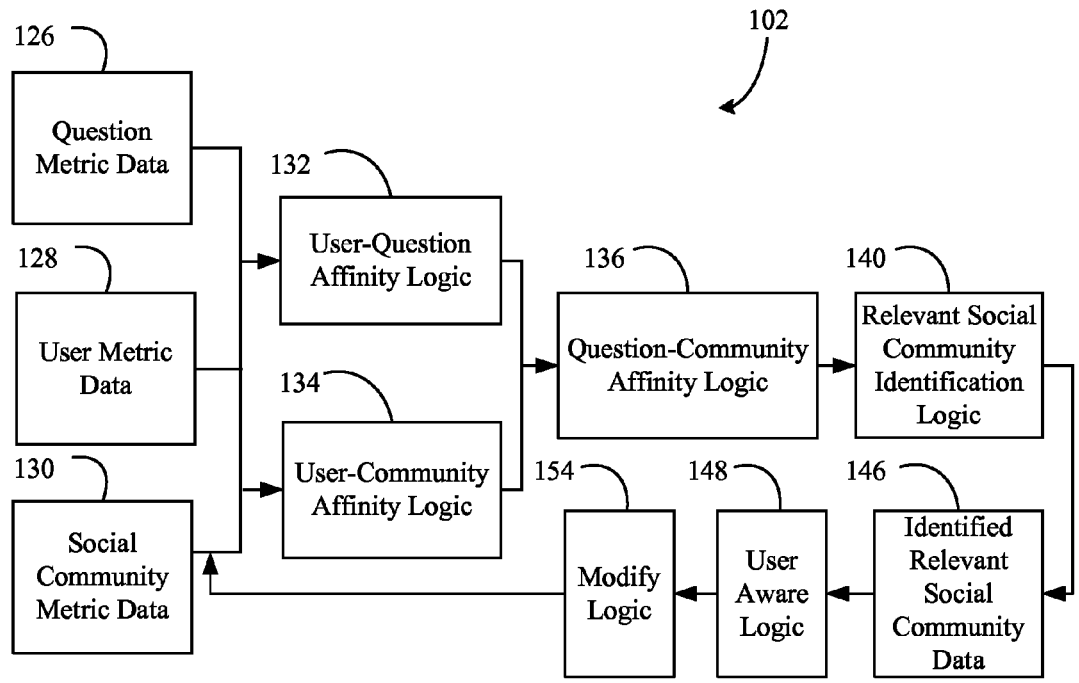
FIG. 2 is a block diagram of an example of an architecture including logic to identify one or more relevant social communities for one or more questions according to an embodiment.

FIG. 2 shows an architecture 102 that may be used to identify one or more relevant social communities for one or more questions according to an embodiment. In the illustrated example, question metric data 126, user metric data 128, and/or social community metric data 130 may be identified and/or received. The question may include any information request to elicit a response, such as a search query via a browser application to elicit one or more answers to the search query. The question and/or the response may be included in any work product that enables cooperation between two or more users, and/or the response may involve any aspect of cooperation.

The question metric data 126 may be associated with the question. In one example, the question metric data 126 may include data related to, for example, a question tag, a question author, a question opinion, a question view, a question comment, a question responder, a question responder community, an unaccepted question answer, an attempted question answer, a question category, a question watch list, a question interaction, a question participant, a question tag, and question content, and so on, or combinations thereof. For the purpose of illustration, the question may include subject matter related to an engineering technical field which may be in a natural language format such as "What is a database management system", may be in a keyword format such as "DBMS", may be in a Boolean expression format such as "Database AND DBMS", and so on, or combinations thereof.

The user metric data 128 may be associated with one or more users. The users may include users (e.g., affiliated members) of one or more online social communities, users of groups that communicate based on one or more criteria, users of groups expressing a relationship, users of a preexisting social community, users sharing work product, and so on, or combinations thereof. In one example, user metric data 128 may include data related to a user affiliation, a user interaction, user search history, a user watch list, a user tag, a user category, a user name, a user address, a recipient, an author, a co-author, an originator, a reviewer, a participant, a bookmark, an answer, a copy action, a share action, an edit action, a response action, a vote action, a view action, an access list, and so on, or combinations thereof. For the purpose of illustration, one of the users may be a database engineer and another user may be a radio frequency engineer.

The social community metric data 130 may include data related to one or more online social communities, groups that communicate based on one or more criteria, groups expressing a relationship, pre-existing social communities, users of a social community, and so on, or combinations thereof. In one example, the social community metric data 130 may include data related to a community affiliation, community content, a community tag, a community category, and so on, or combinations thereof. For the purpose of illustration, the candidate social communities may include a data structure social community, a radio frequency social community, and a mobile device social community. The question metric data 126, the user metric data 128, and/or the community metric data 130 may include data mined from, for example, a browser, an instant message, a chat, an email, a file, a post, a presentation, a document, a spreadsheet, a mailing list, a database access list (ACL), an organization chart, an organization group, a membership, a communication record, metadata, a static group, a dynamic group, a nested group, a hybrid group, a Lightweight Directory Access Protocol (LDAP) group, an opinion associated with a post, data storage, and so on, or combinations thereof.

A user-question affinity logic 132 may retrieve and/or receive at least the question metric data 126 and the user metric data 128 to determine a user-question affinity value, which may represent the extent of affinity (e.g., affinity strength) between the user and the question. For the purpose of illustration, the user-question affinity logic 132 may determine that the user-question affinity value holds a strong value between one or more users (e.g., the database engineer) and the question (e.g., "DBMS"). The user-question affinity logic 132 may also determine that the user-question affinity value holds a weak value between one or more other users (e.g., the radio frequency engineer) and the question (e.g., "DBMS"). In addition, the user-question affinity logic 132 may determine the user-question affinity value based on bi-directional evaluations with respect to the extent of affinity between the users and the question. The user-question affinity logic 132 may determine, establish, and/or modify the user-question affinity value based on any metric data, criteria, and/or thresholds, as described herein.

A user-community affinity logic 134 may retrieve and/or receive at least the user metric data 128 and the social community metric data 130 to determine a user-community affinity value, which may represent the extent of affinity (e.g., affinity strength) between the a user and a community. For the purpose of illustration, the user-community affinity logic 134 may determine that the user-community affinity value holds a strong value between one or more users (e.g., the database engineer) and one or more candidate social communities (e.g., the data structure social community). The community affinity logic 134 may also determine that the user-community affinity value holds a strong value between one or more other users (e.g., the radio frequency engineer) and one or more other candidate social communities (e.g., the radio frequency social community).

The user-community affinity logic 134 may determine that the user-community affinity value holds a moderate value between one or more users (e.g., the radio frequency engineer) for one or more other candidate social communities (e.g., the mobile device social community). The user-community affinity logic 134 may also determine that the user-community affinity value holds a weak value between one or more users (e.g., the database engineer) and one or more candidate social communities (e.g., the radio frequency social community, the mobile device social community). In addition, the user-question affinity logic 134 may determine the user-community affinity value based on bi-directional evaluations with respect to the extent of affinity between the users and the candidate social communities. The user-community affinity logic 134 may determine, establish, and/or modify the user-community affinity value based on any metric data, criteria, and/or thresholds, as described herein.

A question-community affinity logic 136 may retrieve and/or receive at least the user-question affinity values and the user-community affinity values from the user-question affinity logic 132 and the user-community affinity logic 134, respectively, to determine a question-community affinity value. The question-community affinity value may represent the extent of affinity (e.g., affinity strength) between the question and each of the candidate social communities. The question-community affinity value may be calculated, for example using a running average, a running median, simple averaging, simple medians, and so on, or combinations thereof. For the purpose of illustration, the question-community affinity logic 136 may determine that the question-community affinity value holds a strong value between the question (e.g., "DBMS") and one or more candidate social communities (e.g., the data structure social community). The question-community affinity logic 136 may also determine that the question-community affinity value holds a weak value between the question (e.g., "DBMS") and one or more other candidate social communities (e.g., the radio frequency social community and the mobile device social community).

The question-community affinity logic 136 may determine the question-community affinity value based on any predetermined criteria, such as if both the user-question affinity value and the user-community affinity value are each determined to be the particular values (e.g., strong values) and/or the relatively best values (e.g., strongest values) for the question. In addition, the question-community affinity logic 136 may determine the question-community affinity value based on a determination if combinations of the user-question affinity value and the user-community affinity value are the particular values (e.g., strong values) and/or the relatively best values (e.g., strongest values). The question-community affinity value may be accomplished by, for example, the average of the values, the mean of the values, the variance from threshold values, the variance from average values, and so on, or combinations thereof.

In addition, the question-community affinity logic 136 may determine the question-community affinity value based on bi-directional evaluations with respect to the extent of affinity between the question and each of the candidate social communities, insofar as one or more of the user-question affinity values and the user-community affinity values may represent bi-directional evaluations. The question-community affinity logic 136 may determine, establish, and/or modify the question-community affinity value based on any metric data, criteria, and/or thresholds, as described herein. The user-question affinity logic 132, the user-community logic 134, and/or the question-community affinity logic 136 may employ any criteria to supplement the affinity strength values (whether automatic or manual), such as user preference information, history information, community reliability information, user reliability information, and so on, or combinations thereof.

A relevant social community identification logic 140 may retrieve and/or receive the question-community affinity values determined by the question-community affinity logic 136. The relevant community identification logic 140 may identify the relevant social communities based on the question-community affinity values (e.g., strong, strongest, etc.) between the question and each of the plurality of candidate social communities. The relevant community identification logic 140 may sort and/or select candidate social communities based on the question-community affinity values to identify the one or more relevant social communities from the candidate social communities, which may involve automatic implementation, manual implementation, and so on, or combinations thereof.

The relevant community identification logic 140 may evaluate any other criteria to identify a relevant social community, such as predetermined limitations, user preference information, history information, user reliability information, community reliability information, and so on, or combinations thereof. Identified relevant social community data 146 generated by the relevant social community identification logic 140 may be stored, provided to a requestor, provided to a user, provided to logic, and so on, or combinations thereof. For the purpose of illustration, the identified relevant social community data 146 determined by the relevant social community identification logic 140 may identify that one or more candidate social communities (e.g., the data structure social community) is a relevant social community for the question (e.g., "DBMS").

A user aware logic 148 may retrieve and/or receive the identified relevant social community data 146 generated by the relevant social community identification logic 140. The user aware logic 148 may enable users, such as members affiliated with the relevant social community (e.g., all of the members, part of the members, etc.), to become aware of the question, whether or not they wish to respond. The user aware logic 148 may send an automatic notification about the question to one or more users, such as members of the affiliated members, according to, and/or may enable one or more requestors and/or users to set, notification preferences (e.g., preference for notifications, notification timing, notification filtering, manner of notification such as links or folders, etc.), to set notification security preferences (e.g., encryption, passwords, etc.), and so on, or combinations thereof. In addition, the user aware logic 148 may notify the requestor about the users, the affiliated members, and/or the relevant social communities, such as information related to an intention to respond, related to the user qualifications, related to the member affiliation with the relevant social community (e.g., creator, relatively high activity, relatively high rating, etc.), and so on, or combinations thereof.

The user aware logic 148 may also enable the user, such as the members affiliated with the relevant social community (e.g., all of the members, part of the members, etc.), to respond to the question. The user aware logic 148 may enable the users, such as the members affiliated with the relevant social communities (e.g., all of the members, part of the members, etc.), to have and/or gain automatic access to the question to respond, secure access to the question to respond, appropriate access to the question to respond, and so on, or combinations thereof. Thus, the question may be available to the users to enable the users to respond to the question. The user aware logic 144 may also route the question to the user, for example via the automatic notification mechanism. The access may be provided by the user aware logic 148 though a path (e.g., link, folder, etc.) by rendering the latest version of the question, and so on, or combinations thereof.

The user aware logic 148 may provide access according to, and/or may enable the setting of, access preferences (e.g., prefer certain paths, access timing, access filtering, manner of access such as links or folders, etc.), access security preferences (e.g., encryption, passwords, etc.), access privilege preferences (e.g., read, write, etc.) and so on, or combinations thereof. Thus, for the purpose of illustration, the user aware logic 148 may route the question to one or more relevant social communities (e.g., the data structure social community) based on the question-community affinity value and/or may enable the question to be available to one or more users (e.g., each member of the one or more relevant social communities) to respond to the question. In addition, the user aware logic 148 may provide and/or store information related to such notification and/or response processes, including information related to the users responding, users voting, users viewing, answers accepted, answers rejected, rating information, and so on, or combinations thereof.

A modify logic 154 may retrieve and/or receive data related to the notification and/or the response processes from the user aware logic 148. The modify logic 154 may adaptively modify the question-community affinity value based on historical information, natural language processing (NLP), and/or machine learning (ML). In one example, the history information may include data related to questions routed to one or more relevant social communities, questions successfully answered by one or more members of the relevant social communities, and so on, or combinations thereof. The history information may be determined using similar processes to determine the question metric data 126, the user metric data 128, and/or the social community metric data 130. Examples may include one or more data mining processes, as described in detail below.

In addition, NLP may be employed for one or more questions to determine if the question is associated with one or more classifications. In one example, statistical NLP may be employed. ML may also be employed such that the architecture 102 may learn from successes (and/or mistakes) related to previously routed questions, for example based on rating information, voting information, acceptance information, and so on, or combinations thereof. Examples may include one or more machine learning processes, as described in detail below. Thus, for the purpose of illustration, the user modify logic 154 may modify the question-community affinity value generated by the question-community affinity logic 136 towards (or away) a particular value (e.g., strong) based on the history information, NLP, and/or ML.

Figure 3:
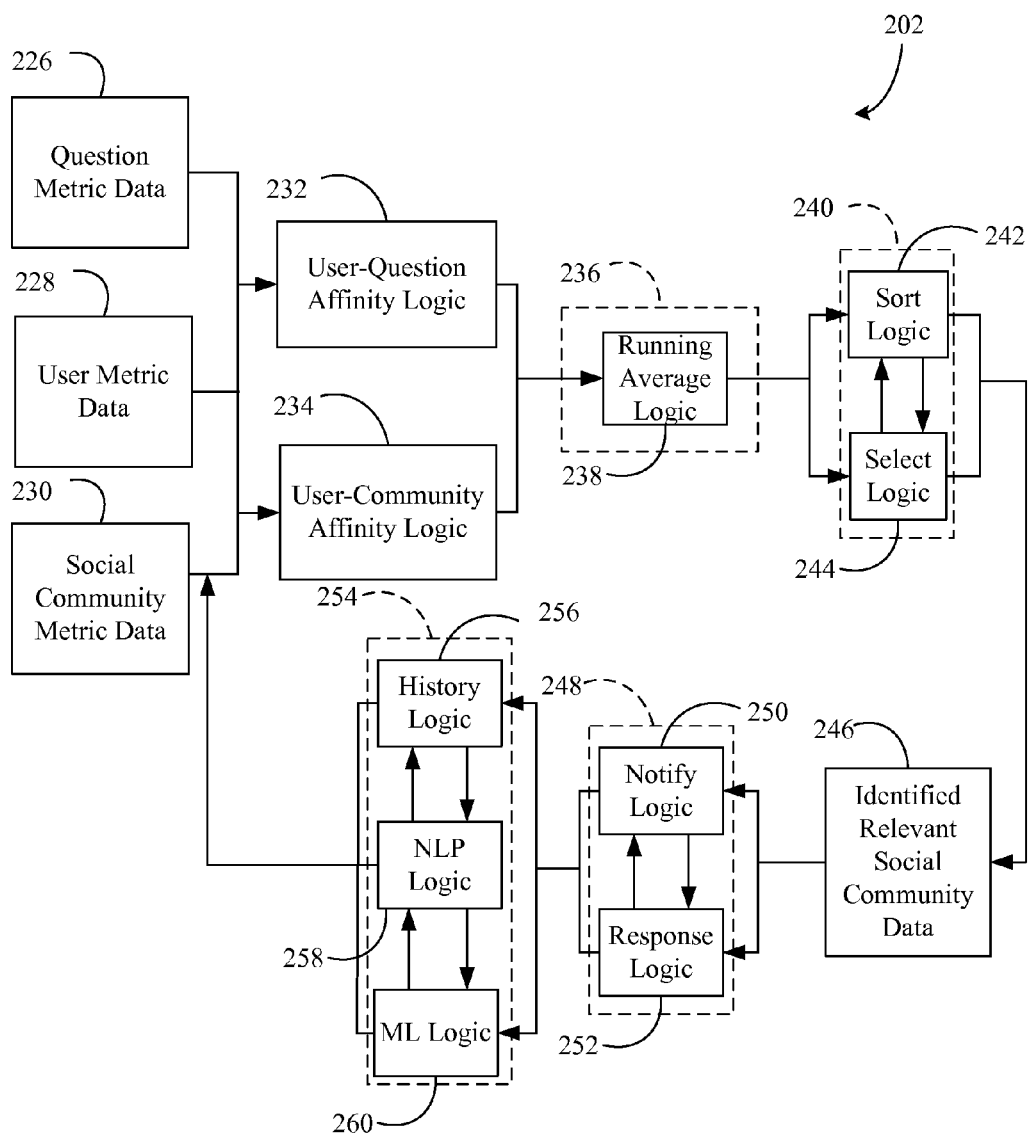
FIG. 3 is a block diagram of an example of an architecture including a variation in logic to identify one or more relevant social communities for one or more questions including according to an embodiment.

Turning now to FIG. 3, an architecture 202 is shown that may be used to identify one or more relevant social communities for one or more questions according to an embodiment. Logic components identified in the architecture 202 of FIG. 3 having similar reference numerals as those already discussed in the architecture 102 of FIG. 2 are to be understood to incorporate similar functionality. In this variation, the question-community affinity logic 236 may include a running average logic 238. The running average logic 238 may calculate a running average (e.g., moving average) using a numerical user-question affinity value and a numerical user-community affinity value to determine a numerical question-community affinity value. The running average may be used to identify one or more relevant social communities from the candidate social communities.

The running average may be calculated by any suitable computation. In one example, the running average may be calculated by employing a running average of numerical user-question affinity values and numerical user-community affinity values for all users in a set of users, for all user in a candidate social community, and so on, or combinations thereof. Generally, given a series of numbers and a fixed subset size, the first element of the moving average may be obtained by taking the average of the initial fixed subset of the number series. The subset may be modified by "shifting forward"; namely, by excluding the first number of the series and including the next number following the original subset in the series. This may create a new subset of numbers, which may be averaged. This process may be repeated over the entire data series. A plot line may connect all the (fixed) averages, which may represent the moving average. Thus, the moving average may be a set of numbers, each of which may be the average of the corresponding subset of a larger set of datum points. The moving average may also use unequal weights for each datum value in the subset to emphasize particular values in the subset. The running average may include a simple moving average, a cumulative moving average, a weighed moving average, an exponential moving average, a modified moving average, and so on, or combinations thereof.

In addition, a social community identification logic 240 may include a sort logic 242 to sort each of the candidate social communities based on the question-community affinity value, to identify the relevant social communities from the candidate social communities. The sort logic 242 may implement partitioned ordering, separate ordering, mixed ordering, and so on, or combinations thereof. The sort logic 242 may implement sorting before, during, after, and/or irrespective of any selecting. The sort logic 242 may involve automatic sorting, manual sorting (e.g., via user input), and so on, or combinations thereof. For the purpose of illustration, the sort logic 242 may automatically sort the candidate social communities in descending order (e.g., (X) and then (Y) and/or (Z), already discussed in FIG. 1; the data structure social community and then the radio frequency social community and/or the mobile device social community, already discussed in FIG. 2) using the corresponding question-community affinity value (e.g., converted and/or represented in decimal form, percentage for, etc.). In addition, the sort logic 242 may consider any other criteria (whether to implement manual and/or automatic sorting), such as pre-determined limitations, user preference information, history information, user reliability information, community reliability information, and so on, or combinations thereof. For example, the sort logic 242 may consider requestor and/or user input to enable the requestor and/or user to manually sort the candidate social communities. The sort logic 242 may also store and/or provide the sort as the part of identified relevant social community data 246.

The social community identification logic 240 may also include a select logic 244 to select one or more of the candidate social communities based on the question-community affinity value, to identify the relevant social communities from the candidate social communities. The select logic 244 may implement selection before, during, after, and/or irrespective of any sorting. The select logic 244 may involve automatic selection, manual selection (e.g., via user input), and so on, or combinations thereof. For the purpose of illustration, the select logic 244 may select one or more candidate social community as the relevant social community for the question using the corresponding question-community affinity value (e.g., select (X) for (Q), already discussed in FIG. 1; select the data structure social community for the question "DBMS", already discussed in FIG. 1). In addition, the select logic 244 may consider any other criteria (whether to implement manual and/or automatic selecting), such as predetermined limitations, user preference information, history information, user reliability information, community reliability information, and so on, or combinations thereof. For example, the select logic 244 may consider requestor and/or user input to enable the requestor and/or users to manually select the candidate social communities. The select logic 244 may also store and/or provide the selection as the part of the identified relevant social community data 242.

A user aware logic 248 may retrieve and/or receive the identified relevant social community data 246 generated by the sort logic 242 and/or the select logic 242 to make one or more users, such as a member affiliated with the relevant social community, aware of the question. The user aware logic 248 may include a notify logic 250 to make the user, such as the affiliated members (e.g., all of the members, part of the members, etc.), aware of the question, whether or not they wish to respond. The notify logic 250 may send the users (e.g., affiliated members) an automatic notification about the question. The notify logic 250 may notify according to, and/or enable one or more requestors and/or users to set, notification preferences. The notification preferences may include whether to cease and/or prevent automatic notifications, to prefer automatic notifications, to become aware by actively accepting automatic notifications, to become aware by actively searching in folders and/or shared environments for new and/or updated questions, to specify which requestors and/or groups may result in an automatic notifications, and so on, or combinations thereof.

The notify logic 250 may notify according to, and/or enable one or more requestors and/or users to set, timing preferences. The timing preferences may include providing the notification via the notify logic 250 immediately, on occurrence of an event (e.g., log into email, relevant social community, etc.), and so on, or combinations thereof. The notify logic 250 may notify according to, and/or enable one or more requestors and/or users to set, security preferences. The security preferences may include providing the notification via the notify logic 250 over a secure connection using encryption, tunneling, certificates, and so on, or combinations thereof. In addition, the notify logic 250 may notify the requestor about the users, the affiliated members, and/or the relevant social communities, such as information related to an intention to respond, related to the user qualifications, related to the member affiliation with the relevant social community (e.g., none, creator, relatively high activity, relatively high rating, etc.), and so on, or combinations thereof.

The user aware logic 250 may retrieve and/or receive the identified relevant social community data 246 generated by the sort logic 242 and/or the select logic 244 to enable one or more users (e.g., members affiliated with the relevant social community) to respond to the question. The user aware logic 250 may include a response logic 252 to allow the users (e.g., affiliated members) to have automatic access to the question, secure access to the question, appropriate access to the question, and so on, and combinations thereof.

Thus, the question may be available to the users to enable the users to respond to the question. The response logic 252 may route the question to the user, for example via the automatic notification mechanism. The response logic 252 may allow the user (e.g., affiliated member) to have and/or gain automatic access to the question according to, and/or enable the setting of, access preferences. The access preferences may allow access through a path (e.g., link or address to the question, to a folder, to a shared environment, etc.), through providing the latest version of the question, and so on, or combinations thereof.

The response logic 252 may provide secure access to the question according to, and/or enable the setting of, security preferences. The security preferences may provide and/or verify encryption, tunneling, certificates, and so on, or combinations thereof. The response logic 252 may also provide an appropriate level of access to the question according to, and/or enable the setting of, privilege preferences. The privilege preferences may provide assignment and/or verification of cooperation rights, such as read privileges, write privileges, review privileges, answer privileges, vote privileges, and so on, or combinations thereof. In addition, the response logic 252 may communicate with the notify logic 250 to provide information, such as the changes related to users (e.g., about the affiliated member that intends to cooperate). In addition, the notify logic 250 and/or the response logic 252 may provide and/or store information related to the notification and/or response processes, such as information related to the users responding, users voting, users viewing, answers accepted, answers rejected, rating information, and so on, or combinations thereof.

A modify logic 254 may retrieve and/or receive data related to the notification and/or the response processes from the notify logic 250 and/or the response logic 252, to adaptively modify the question-community affinity value. The modify logic 254 may adaptively modify the question-community affinity value by employing a history logic 256, a natural language processing (NLP) logic 258, and/or a machine learning (ML) logic 260. In one example, history information may include data related to questions routed to one or more relevant social communities, questions successfully answered by one or more users of the relevant social communities, and so on or combinations thereof. The history data may be determined and/or retrieved by the history logic 256 using one or more data mining processes.

The data mining process may employ various tasks including anomaly detection, which may include the identification of unusual data records that may be of interest. The data miming process may include association rule learning, which may search for relationships between variables. The data mining process may include clustering, which may discover groups and/or structures in data that are similar. The data mining process may include classification, which may include generalizing known structure to apply to new data. The data mining process may include regression, which may attempt to determine a function that models the data with the relatively least amount of error. The data mining process may include summarization, which may provide a relatively more compact representation of a data set via visualization and/or report generation. The data mining process may include sequential pattern mining, which may find a set of data item that may occur together relatively frequently in some sequence.

Additionally, the NLP logic 258 may be employed for one or more questions to determine if the question is associated with one or more classifications. In one example, the NLP logic 258 may employ statistical NLP. Statistical NLP may use stochastic, probabilistic, and/or statistical methods to resolve difficulties that may arise from relatively long sentences. Processes for disambiguation may involve the use of corpora and/or Markov models. Statistical NLP may include quantitative approaches to automated language processing, including probabilistic modeling, information theory, and/or linear algebra.

In addition, the ML logic 260 may be employed such that the architecture 202 may learn from successes (and/or mistakes) related to previously routed questions, for example based on rating information, voting information, acceptance information, and so on, or combinations thereof. The ML logic 260 may employ one or more ML processes. ML processes may include supervised learning, which may include a function that may map one or more inputs to one or more outputs. ML processes may include unsupervised learning, which may include models of a set of inputs (e.g., clustering). ML processes may include semi-supervised learning, which may combine labeled and unlabeled data examples. ML processes may include reinforcement learning, which may learn how to respond to an occurrence given an observation about the environment. The ML processes may include learning to learn processes, which may learn a bias based on a previous experience.

Figure 4:
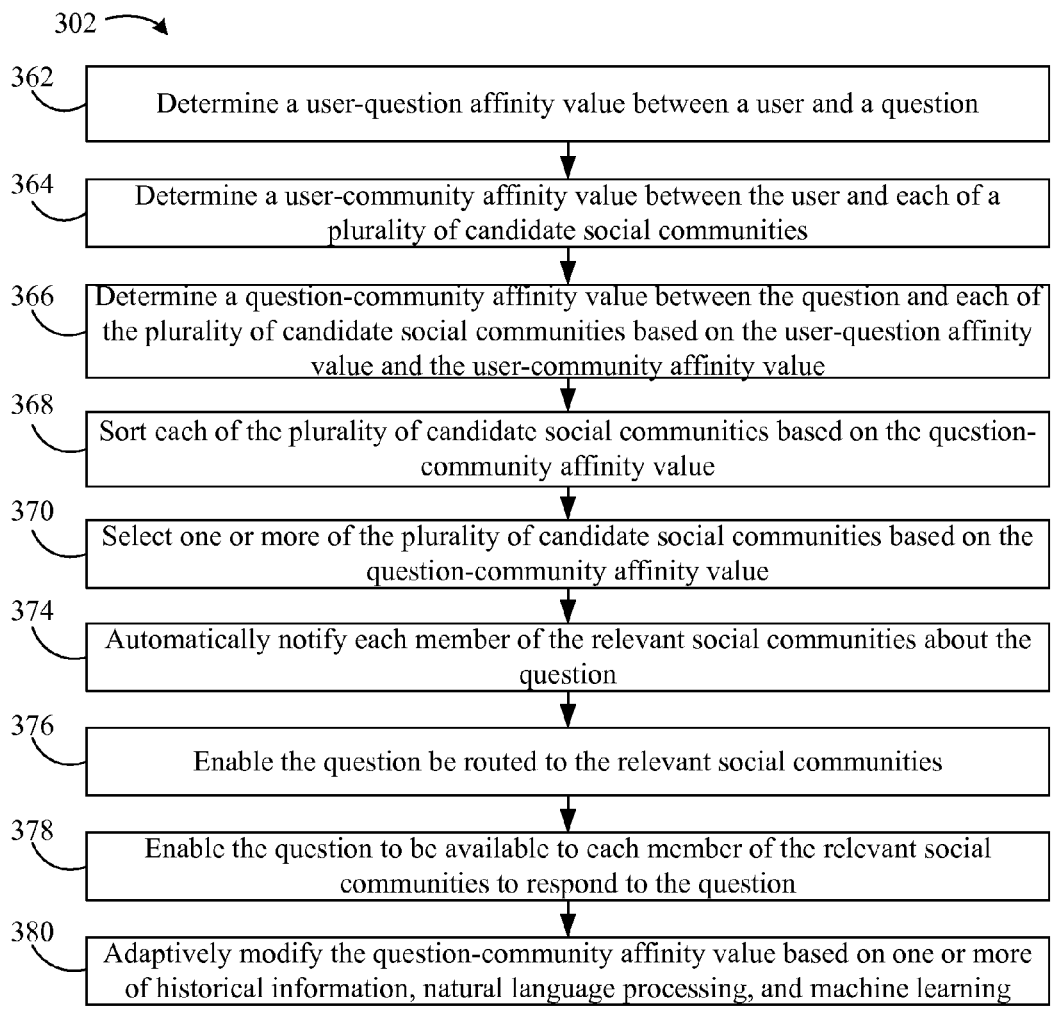
FIG. 4 is a flowchart of an example of a method of identifying one or more relevant social communities for one or more questions according to an embodiment.

FIG. 4 shows a method 302 of identifying one or more relevant social communities for one or more questions according to an embodiment. Illustrated processing block 362 provides for determining a user-question affinity value between a user and a question. The user-question affinity value in block 362 may correspond to, for example, the user-question affinity value 18 (e.g., FIG. 1), already discussed. A user-community affinity value between the user and each of a plurality of candidate social communities may be determined at block 364, wherein the user-community affinity value in block 364 may correspond to, for example, the user-community affinity value 20 (e.g., FIG. 1), already discussed. Block 366 may provide for determining a question-community affinity value between the question and each of the plurality of candidate social communities based on the user-question affinity value and the user-community affinity value. The question-community affinity value may correspond to, for example, the question-community affinity 22 (e.g., FIG. 1), already discussed.

The method 302 may also sort each of the candidate social communities based on the user-community affinity value to identify the relevant social communities at block 368, wherein the relevant social communities may correspond to, for example, the relevant social communities 24 (e.g., FIG. 1), already discussed. Thus, for example, the candidate social communities (X), (Y), (Z) may be sorted to identify the relevant social community 24 (e.g., (X)) for the question (Q) (e.g., FIG. 1), already discussed. The method 302 may also select the candidate social communities based on the user-community affinity value to identify the relevant social communities at block 370, wherein the relevant social communities may correspond to, for example, the relevant social communities 24 (e.g., FIG. 1), already discussed. Thus, for example, a selection may be made among the candidate social communities (X), (Y), (Z) to identify the relevant social community 24 (e.g., (X)) for the question (Q) (e.g., FIG. 1), already discussed.

At least one user (e.g., member affiliated with the relevant social communities) may become aware of the question. Each member of the relevant social communities may be automatically notified about the question at block 374. Thus, for example, each member affiliated with the candidate social community 24 (e.g., (X)) may be automatically notified about the question (Q) (e.g., FIG. 1), already discussed. Additionally, block 376 may provide for enabling the question to be routed to the relevant social community at block 376. Thus, for example, the question (Q) may be automatically routed to the candidate social community 24 (e.g., (X)) (e.g., FIG. 1), already discussed. In addition, block 378 may provide for enabling the question to be available to each member of the relevant social community to respond to the question. Thus, for example, the question (Q) may be available to each member of the relevant candidate social community 24 (e.g., (X)) (e.g., FIG. 1), already discussed. Block 380 may provide for adaptively modifying the question-community affinity value based on one or more historical information, natural language processing, and machine learning. Thus, for example, the question-community affinity 22 (e.g., FIG. 1) may be modified based on one or more historical information, natural language processing, and machine learning, already discussed.

Figure 5:
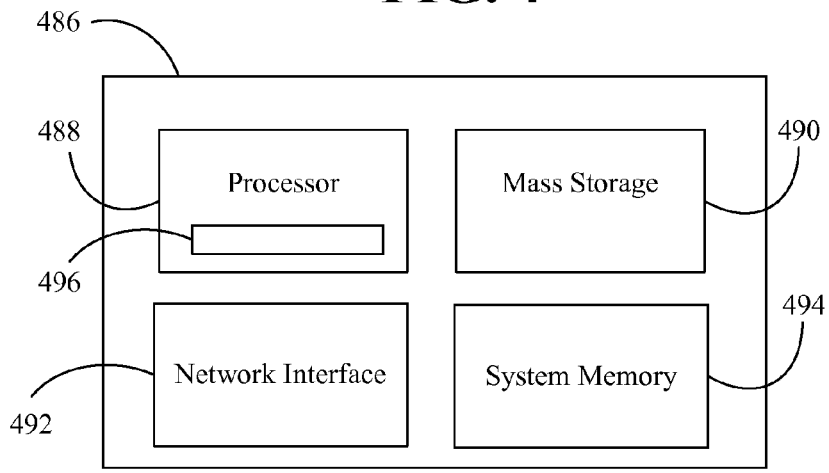
FIG. 5 is a block diagram of an example of a computing device according to an embodiment.

FIG. 5 shows a computing device 486 having a processor 488, mass storage 490 (e.g., read only memory/ROM, optical disk, flash memory), a network interface 492, and system memory 494 (e.g., random access memory/RAM). In the illustrated example, the processor 488 is configured to execute logic 496, wherein the logic 496 may implement one or more aspects of the scheme 10 (FIG. 1), the architecture 102 (FIG. 2), the architecture 202 (FIG. 3), and/or the method 302 (FIG. 4), already discussed. Thus, the logic 496 may enable the computing device 486 to function to identify one or more relevant social communities for one or more collaboration artifacts. The logic 496 may also be implemented as a software application that is distributed among many computers (e.g., local or remote). Thus, while a single computer could provide the functionality described herein, systems implementing these features can use many interconnected computers (e.g., for scalability as well as modular implementation).

Techniques described herein may therefore provide for identifying one or more relevant social communities for one or more questions. The identification may involve more than a mere associations by implementing an evaluation of affinity strengths. Accordingly, evaluating the degree of proximity, relatedness, and/or closeness in the association may maximize a quality and/or quantity of the users. Thus, inefficiencies in answering one or more questions may be minimized.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   determining a user-question affinity value between a user and a question based on one or more user metrics and one or more question metrics, wherein the user-question affinity value indicates an extent of affinity between the user and the question;
   determining a user-community affinity value between the user and each of a plurality of candidate social communities based on at least one of the one or more user metrics and one or more community metrics, wherein the user-community affinity value indicates an extent of affinity between the user and each of the plurality of candidate social communities, and wherein at least one of the plurality of candidate social communities includes a pre-existing online social community having a candidate member that proactively establishes a relationship with another candidate member and forms a group of candidate members that interact with each other; and
   determining a question-community affinity value between the question and each of the plurality of candidate social communities based on the user-question affinity value and the user-community affinity value to identify one or more relevant social communities for the question, wherein the question-community affinity value indicates an extent of affinity between the question and each of the plurality of candidate social communities, and wherein the question is routed to one or more of the relevant social communities based on the question-community affinity value and is available to each member of the group of candidate members to respond to the question when it is determined that the pre-existing online social community is one of the one or more relevant social communities.

2. The method of claim 1, wherein the one or more question metrics includes data related to a question tag, a question author, a question opinion, a question view, a question comment, a question responder, a question responder community, an unaccepted question answer, an attempted question answer, a question category, a question watch list, a question interaction, a question participant, and question content.

3. The method of claim 1, wherein the one or more user metrics includes data related to a user affiliation, a user interaction, a user watch list, a user tag, a user category, a user name, a user address, a recipient, an author, a co-author, an originator, a reviewer, a participant, a bookmark, an answer, a copy action, a share action, an edit action, a response action, a vote action, a view action, and an access list.

4. The method of claim 1, wherein the one or more community metrics includes data related to a community affiliation, community content, a community tag, and a community category.

5. The method of claim 1, further comprising one or more of:
sorting each of the plurality of candidate social communities based on the question-community affinity value to identify the one or more relevant social communities from the plurality of candidate social communities; and
selecting one or more of the plurality of candidate social communities based on the question-community affinity value to identify the one or more relevant social communities from the plurality of candidate social communities.

6. The method of claim 1, further comprising automatically notifying each member of the one or more relevant social communities about the question.

7. The method of claim 1, further comprising calculating a running average using a numerical user-question affinity value and a numerical user-community affinity value to determine a numerical question-community affinity value.

8. The method of claim 1, further comprising adaptively modifying the question-community affinity value based on historical information.

9. A method comprising:
determining a user-question affinity value between a user and a question that indicates an extent of affinity between the user and the question;
determining a user-community affinity value between the user and each of a plurality of candidate social communities that indicates an extent of affinity between the user and each of the plurality of candidate social communities, wherein at least one of the plurality of candidate social communities includes a pre-existing online social community having a candidate member that proactively establishes a relationship with another candidate member to form a group of candidate members that interact with each other; and
determining a question-community affinity value between the question and each of the plurality of candidate social communities based on the user-question affinity value and the user-community affinity value to identify one or more relevant social communities for the question, wherein the question-community affinity value indicates an extent of affinity between the question and each of the plurality of candidate social communities, and wherein the question is available to each member of the group of candidate members to respond to the question when it is determined that the pre-existing online social community is one of the one or more relevant social communities.

10. The method of claim 9, further comprising:
sorting each of the plurality of candidate social communities based on the question-community affinity value to identify the one or more relevant social communities from the plurality of candidate social communities; and
selecting one or more of the plurality of candidate social communities based on the question-community affinity value to identify the one or more relevant social communities from the plurality of candidate social communities.

11. The method of claim 9, further comprising routing the question to the one or more relevant social communities based on the question-community affinity value.

12. The method of claim 9, further comprising automatically notifying each member of the one or more relevant social communities about the question.

13. The method of claim 9, further comprising calculating a running average using a numerical user-question affinity value and a numerical user-community affinity value to determine a numerical question-community affinity value.

14. The method of claim 9, further comprising adaptively modifying the question-community affinity value based on one or more of historical information, natural language processing, and machine learning.

15. The method of claim 9, wherein the pre-existing online social community includes one or more of an intranet social community and an internet social community.

16. The method of claim 9, wherein one or more of the user-question affinity value, the user-community affinity value, and the question-community affinity includes a bi-directional evaluation value.

17. The method of claim 16, wherein the user-question affinity value is based on a determination of affinity of the user for the question and a determination of affinity of the question for the user, and wherein the user-community affinity value is based on a determination of affinity of the user for a candidate social community and a determination of affinity of the candidate social community for the user.

18. The method of claim 9, further comprising applying a threshold to determine one or more of the user-question affinity value, the user-community affinity value, and the question-community affinity value.

19. The method of claim 18, wherein the threshold includes one or more of a predetermined frequency of occurrence with respect to user activity, a number of votes, and a number of candidate members in a candidate social community.

* * * * *